June 30, 1953 A. WIEBE 2,643,461
HEADWEAR SIZING GAUGE
Filed April 11, 1949 2 Sheets-Sheet 1

INVENTOR.
Albert Wiebe
BY W. J. Eccleston
ATTORNEY

June 30, 1953  A. WIEBE  2,643,461
HEADWEAR SIZING GAUGE
Filed April 11, 1949  2 Sheets-Sheet 2

INVENTOR.
Albert Wiebe
BY W. J. Eccleston
ATTORNEY

Patented June 30, 1953

2,643,461

UNITED STATES PATENT OFFICE 2,643,461

HEADWEAR SIZING GAUGE

Albert Wiebe, Brooklyn, N. Y.

Application April 11, 1949, Serial No. 86,835

13 Claims. (Cl. 33—178)

(Granted under Title 35, U. S. Code (1952), sec. 266)

The invention described herein, if patented, may be manufactured and used by or for the Government for governmental purposes, without the payment to me of any royalty thereon.

This invention relates to gages primarily for determining the sizes of headwear such as hats or caps, though capable of use in the measurement of other hollow articles.

Among other objects, the invention aims to provide a gage which is of simple construction so that it is readily manufactured, which automatically engages the interior of the object with a predetermined uniform pressure, which has a clutch mechanism preventing the operator from influencing the indicated size of the object, which is easily operated, which measures both in fractions of inches and in conventional head sizes with a considerable degree of accuracy, and which may, if desired, be easily modified to become a hat-stretching device. Other objects will be understood or inferred from the following description of one embodiment of the invention shown in the accompanying drawings forming a part of this specification.

In said drawings:

Fig. 6 is a detail in elevation showing the stop means.

Figure 4:
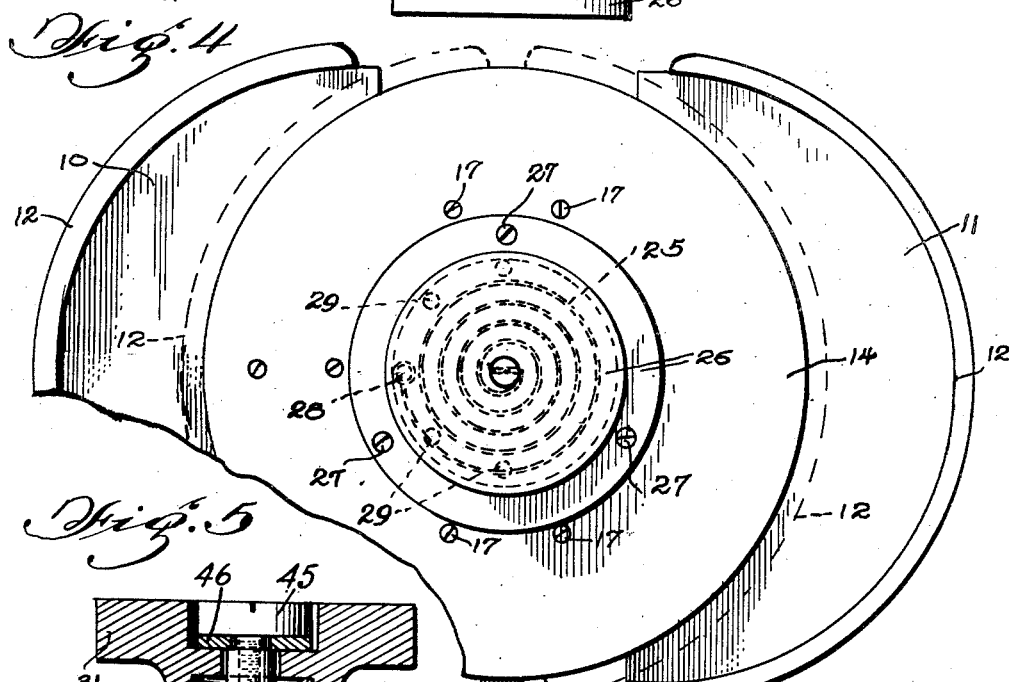
Fig. 4 is a fragmentary bottom plan view, the hat-engaging parts being shown separated in full lines and contracted in dotted lines.
Figure 5:
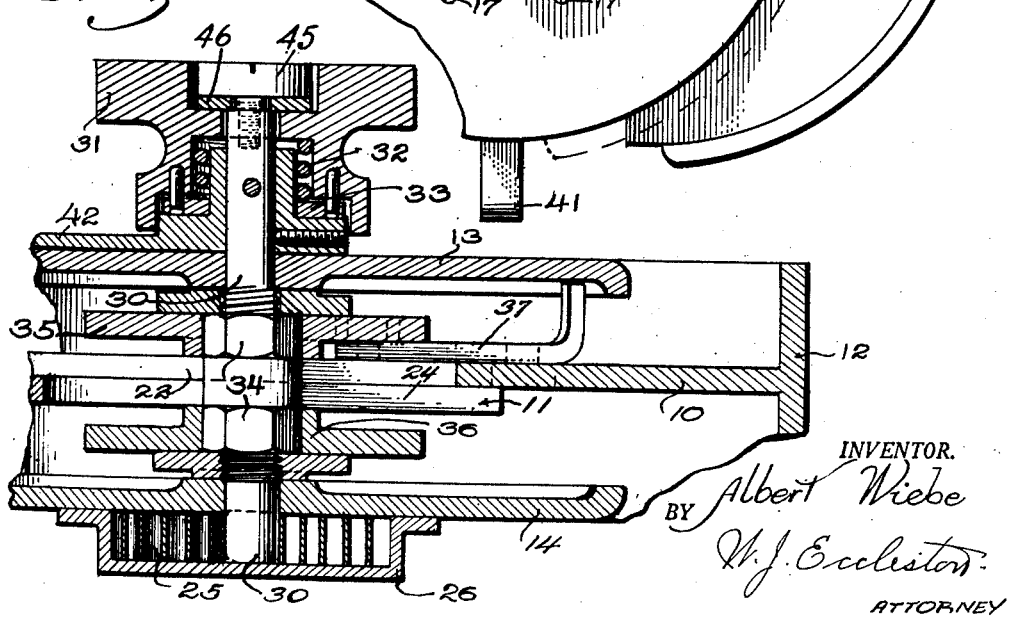
Fig. 5 is a partial vertical section, on an enlarged scale.

Referring particularly to the drawings, the preferred gage comprises gage members including a pair of flat elongated contour plates 10, 11, each having arcuate hat-engaging flanges 12, the contour plates being shown in sliding contact with each other. The flanges 12 are disposed at right angles to the longitudinal axis of plates 10 and 11, and the upper and lower edges of flanges 12 on the opposite plates lie in the same planes respectively. There are also an upper circular plate or disk 13, a lower circular plate or disk 14, and rectangular tie blocks or spacer blocks 15, 16 which are secured by screws 17 to the disks 13, 14 to hold said disks in parallelism. The two disks and the spacer blocks thus form a rigid assembly which provides a frame or support for the two contour plates and their operating mechanisms. The spacer blocks 15, 16 also serve as guides for the slidable contour plates, as the contour plates have straight edges 18, 19, 18a, 19a respectively for direct sliding contact with the inner flat faces of the spacer blocks. Slots 20 having walls formed in part by the edges 18, 18a, 19, 19a are cut in the contour plates and are adapted to receive the spacer blocks when the contour plates are moved inwardly to or toward the dotted line position of Fig. 4. Further to guide the contour plates 10, 11 as they move back and forth, said plates have straight slots 22, 24 respectively whose walls contact a central operating shaft 30, to be described. Also the contour plates may have complementary parts which directly engage each other, such as straight ribs fitting in slots, to confine the contour plates to rectilinear motion; this modification is not shown but will be understood without illustration.

To cause the contour plates automatically to engage the inside surfaces of the object being measured, a spiral spring 25 is provided in a flat housing 26 removably secured to the underside of the lower disk 14 as by screws 27. One end of spring 25 is anchored to disk 14 as by a multiposition retaining screw 28, said screw being entered in a selected tapped bore 29 which is one of a number provided for the purpose of adjusting the tension (potential energy) of spring 25. The other end of said spring is secured to the central shaft 30 which passes through a bore in the lower disk 14, through the slots 22, 24 of the contour plates, and through a bore in the upper disk 13.

The shaft 30 may also be rotated by means of an operating knob 31 which is operatively connected to the shaft through a clutch. As shown, this clutch preferably is of the friction type, and one element of the clutch is formed by an annular flange on the hub of a pointer 42 pinned to the outwardly projecting end of the shaft 30. The operating knob 31 has a variable diameter recess to receive the hub of the pointer 42, an annular plate 33 pinned to the knob and forming the second element of the clutch, and a compression spring 32 which urges the annular clutch plate 33 into frictional engagement with the annular flange on the hub of pointer 42 to thus provide a clutch action between the knob 31 and shaft 30 through the hub of the pointer 42.

Knob 31 is held upon the shaft 30 in opposition to the force exerted by compression spring 32 by means of a screw 45 threaded into the end of the shaft. A washer 46, interposed between the head of screw 45 and the end of shaft 30, is non-rotatably fixed on the shaft so that it turns only with the shaft and thus prevents loosening of screw 45 when the knob 31 is rotated relative to the shaft as, for example, when the clutch slips while the knob is being turned.

The central shaft has hexagonal portions 34 by which it is non-rotatably but removably coupled to a pair of flat, circular eccentric plates 35, 36 which in their oscillation move links 37, 38, said links being pivotally connected at opposite ends to the contour plates and the eccentric plates. By virtue of the operative connection thus provided between shaft 30 and the gage members 10 and 11 by this crank arm structure, the gage members are moved into and out of gaging position in response to opposite rotary movements of the shaft.

To hold the device against moving while the knob is being operated, and to facilitate handling the device, a handle 41 is fixed to and extends upwardly from the upper disk 13. Pointer 42 which is fixed to the central shaft 30 as previously mentioned moves over a scale 43 fixed upon disk 13. If disk 13 is a transparent plastic, the scale 43 may be made fast to the underside of disk 13 where its graduations will be visible but protected against wear and possible obliteration, or if disk 13 is not transparent the scale may be otherwise arranged to assure a long life. Scale 43 is marked to indicate both head sizes and inch measurements, an arrangement peculiarly useful when measuring service hats. Other scales will be substituted if objects other than headwear are to be measured.

The gage may be made of light weight metal, or plastic, or wood or combinations of these materials. A stop 44, in the form of a screw secured to the edge of either contour plate, may contact an edge of either spacer block 15, 16, as shown in Fig. 6, when the contour plates are separated by the spiral spring to the maximum extent desired. Inward movement of the contour plates may be stopped by contact of the inner ends of slots 22, 24 with the central shaft, or in other ways, for example, contact of the arcuate flanges 12 with the edges of the disks 13, 14, see Fig. 4.

Figure 1:
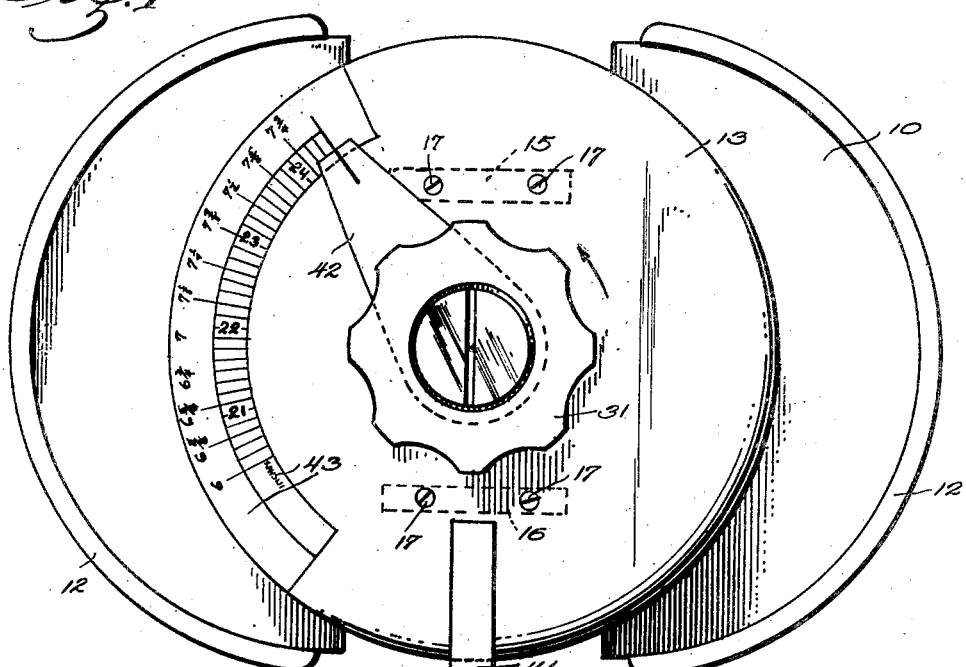
Fig. 1 is a top plan view showing the device in normal or fully expanded position, a small portion of the handle being broken away.
Figure 2:
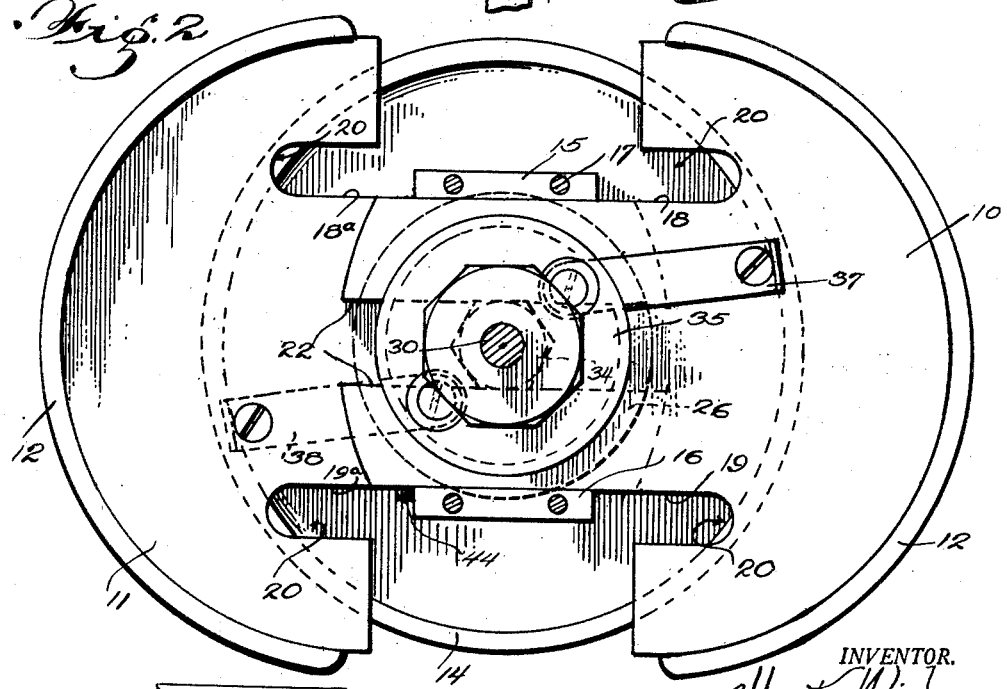
Fig. 2 is a sectional elevation showing the parts in the position of Fig. 1 but omitting the operating knob, the upper plate with its scale and handle, the pointer which moves over the scale, and other minor parts.
Figure 3:
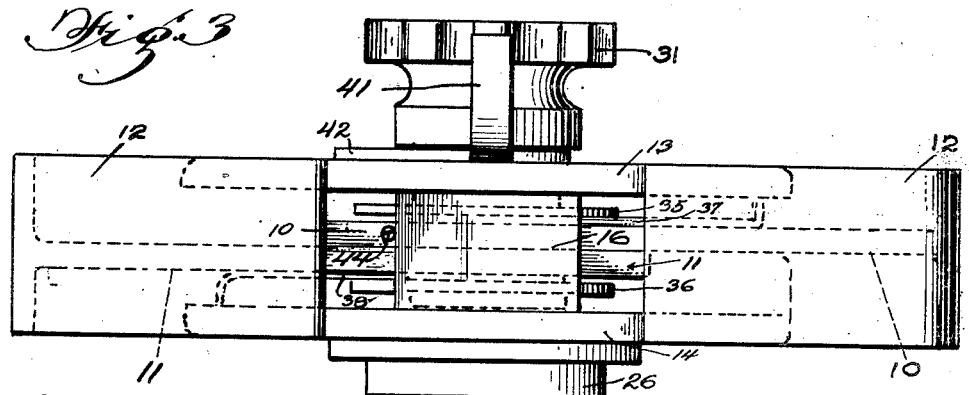
Fig. 3 is a side elevation, the view being taken from the bottom of Fig. 1.

Briefly to describe the operation of the improved gage, the torsion spring 25 normally biases the shaft 30 in a direction to urge the plate members 10 and 11 to extended position through the crank arm structure consisting of eccentric plates 35 and 36 and links 37 and 38. To move the gage members to contracted position so that the gage may be inserted in a hat or other headgear, the handle 41 of the gage is grasped in one hand and the operating knob 31 turned counter-clockwise (Fig. 1). Since the clutch spring 32 exerts sufficient force on the clutch plate 33 so that the frictional restraint between this plate and the hub of pointer 42 is greater than the torque exerted by torsion spring 25, the pointer and the shaft 30 to which it is fixed will turn with the operating knob 31. Thereupon the gage members are moved toward contracted position through the crank structure previously mentioned until they arrive at the position shown in dotted lines in Fig. 4. Thereafter the clutch will slip if the knob is turned further in the same direction.

Upon release of the knob 31 after the gage has been placed in gaging position relative to a hat or other headgear, the spring 25 will turn the shaft 30 and operating knob 31 in a clockwise direction (Fig. 1) until the flanges 12 on the gage members contact the band of the headgear being measured and tension the same to the degree required accurately to indicate the size of the headgear being gaged. However, the force exerted by the spring 25 is sufficient to give an accurate reading on the scale 43 only when relatively lightweight felt hats or rain covers for caps or hat are being gaged. In the event heavier headgear is to be gaged, more force must be applied to the gage members than the spring 25 is capable of applying to give an accurate reading of the size. Due to the fact that the clutch has a greater torque transmitting capacity than the spring 25, this force may be supplied by turning the operating knob 31 in a clockwise direction (Fig. 1) until the clutch between the knob and shaft 30 slips.

It will thus be apparent that a gage has been provided in which a force of one of two predetermined values may be applied to the gage members so that headgear of all weights may be gaged with the same gage and the headgear is protected from undue distortion in all cases. Arcuate readings of size are therefore obtained on the scale 43 and the likelihood of stretching the headgear is eliminated.

The described construction may be easily modified to form a hat-stretching mechanism. By detaching the operating knob 31 and substituting a lever which is rigidly fixed to the central shaft, and removing the stop screw 44, manual force may be applied to the contour plates to separate them to the maximum extent permitted by the construction. The contour plates may have small conduits with connections to a supply of steam and with outlets at the hat-contacting surfaces, whereupon heat may be applied simultaneously with stretching force. The application of heat and pressure to enlarge a hat or cap is well known, being shown in Patents Nos. 1,118,550 and 1,371,247, and hence will not be illustrated or claimed herein.

Numerous departures from the described construction may be resorted to, provided the changes or modifications are within the scope of the appended claims.

Having described a preferred embodiment of my invention, what I claim as new and desire to secure by Letters Patent is:

1. A gage for determining the sizes of hats, caps and the like comprising, in combination, a pair of curved contour plates adapted to contact the interior of the hat or cap; means for slidably supporting and guiding the contour plates so that they must move in straight lines toward or away from each other; a central pivotal member; a pair of eccentric plates fixed to the central pivotal member; a pair of links to form a driving connection between said eccentric plates and the contour plates; a knob or handle connected to the central pivotal member for turning the same; said pivotal connections between the links and the eccentric and contour plates being so located that turning the knob or handle in one direction will cause the contour plates to move equal distances toward each other; a spring connected to the central pivotal member to cause the contour plates to separate; stop means to prevent separation of the contour plates beyond a predetermined extent; a pointer secured at one end to the central pivotal member; and a scale fixed to said supporting and guiding means and co-operating with the outer end of the pointer to give readings commensurate with the sizes of the hat or cap.

2. The invention as defined in claim 1, wherein there is a slipping clutch interposed between the knob or handle and the central pivotal member and so constructed and arranged as to permit the knob or handle to move relative to the central pivotal member whenever the resistance of the central pivotal member to turning exceeds a predetermined force.

3. The invention as defined in claim 1, wherein the gage is further provided with means connected with one end of the spring and engageable with said supporting and guiding means at selectively different points to increase or decrease the potential energy of said spring.

4. The invention as defined in claim 3, with the addition of a slipping clutch interposed between the knob or handle and the central pivotal member and operating to cause the knob or handle to move relative to the central pivotal member whenever the resistance to turning the latter exceeds a predetermined force.

5. In a headgear or like gage, the combination comprising a plurality of relatively movable gage members, means for relatively moving said gage members into and out of gaging position including rotatable gage member operating means, yieldable means connected to rotate said gage member operating means in one direction, manually operable means to rotate said gage member operating means in opposite directions including means to limit the torque which may be applied to said gage member operating means to a predetermined value in excess of the force applied by said yieldable means, and indicating means visually to indicate sizes corresponding to the various relative positions to which said gage members are movable.

6. In a headgear or like gage the combination comprising a plurality of relatively movable gage members, means for relatively moving said gage members into and out of gaging position including rotatable gage member operating means, yieldable means connected to apply a predetermined torque in one direction to said operating means, other means for applying torque in opposite directions to said operating means including manually operable means and a clutch between the manually operable means and gage member operating means, said clutch having a torque transmitting capacity of a predetermined value in excess of the torque applying capacity of said yieldable means, and indicating means visually to indicate sizes corresponding to the various relative positions to which gage members are movable.

7. In a headgear or like gage the combination comprising a plurality of relatively movable gage members, means for relatively moving said gage members into and out of gaging position including a rotatable shaft, a torsion spring connected to apply a predetermined torque in one direction to said shaft, other means for applying torque to said shaft including manually operable means, a clutch between the manually operable means and shaft for applying torque in opposite directions to the shaft in response to opposite rotary movements of the manually operable means, a spring to control the torque transmitting capacity of said clutch, said spring normally rendering the clutch effective to apply torque to said shaft of a predetermined value in excess of the torque applied by said torsion spring, and indicating means operated in correlated relation to the movement of said gage members visually to indicate sizes corresponding to the various relative positions to which said gage members are movable.

8. In a headgear or like gage the combination comprising a plurality of relatively movable gage members, means for relatively moving said gage members into and out of gaging position including a rotatable shaft, a torsion spring, means operatively to connect the opposite ends of said spring respectively to said shaft and a fixed part of said gage to render the torsion spring effective to apply a predetermined torque in one direction to said shaft including means for relatively angularly varying the effective point of connection between the opposite ends of said torsion spring and said shaft and the fixed part of said gage thereby to vary the bias exerted by the spring upon said shaft, manually operable means to rotate said shaft in opposite directions including means to limit the torque which may be applied to the shaft to a predetermined value in excess of the torque applied by said torsion spring, and indicating means visually to indicate sizes corresponding to the various relative positions to which said gage members are movable.

9. In a headgear or like gage, the combination comprising a plurality of relatively movable gage members, means for relatively moving said gage members into and out of gaging position including a shaft rotatable in opposite directions, a torsion spring for applying a predetermined torque in one direction to said shaft, cooperating indicator means to indicate sizes corresponding to the various relative positions to which said gage members are movable including means on a fixed part of said gage and means movable relative thereto in response to the movement of said gage members, said latter means including a part having a hub fixed upon said oppositely rotatable shaft, manually operable means movable in opposite directions relative to said hub and shaft, and a clutch between said hub and said manually operable means to apply torque to said hub in response to movement of said manually operable means in excess of the torque applied by the torsion spring so that torque of two predetermined values may be selectively applied in said one direction to said shaft and said shaft may be rotated by said manually operable means in a direction opposite to the direction it is rotated by said spring.

10. In a headgear or like gage, the combination comprising a pair of gage members each including oppositely extending elongated arms, fixed supporting structure to constrain said arms for relative reciprocatory movement along the longitudinal axis thereof for moving said gage members into and out of gaging position, a shaft rotatably supported by said fixed supporting structure, crank arm structure operatively connected to said shaft and said gage members for relatively moving the latter into and out of gaging position in response to opposite rotary movements of said shaft, a spring connected to bias said shaft for rotation in one direction, and manually operable means to rotate said shaft in either direction including means to limit the torque which may be applied to the shaft to a predetermined value in excess of the biasing force of said spring.

11. A gage for measuring the internal peripheral dimensions of hollow objects comprising in combination a pair of reciprocatory plates having object-contacting surfaces, means serving as a support and guide for said reciprocatory plates, a spring operatively connected to said means and said plates yieldingly to urge the object-contacting surfaces apart, means to adjust the tension of the spring, means to limit separation of said object-contacting surfaces, and manually operated mechanism connected to the plates selectively to apply oppositely directed driving forces to said plates in excess of the force said spring is capable of exerting outwardly including a slipping clutch to limit the force applied thereby to a predetermined valve in excess of the force applied by the spring.

12. A gage of the character described comprising in combination a pair of flat elongated plates having straight lateral edges, arcuate flanges secured to the outer portions of said elongated plates substantially at right angles to the plane of said plates and adapted to engage the article being measured, a rigid supporting frame having top, bottom and opposite side walls extending between said top and bottom walls, opposite walls in said frame engaging the lateral edges of said plates to constrain the latter for relative reciprocatory movement along the longitudinal axis thereof, an operating shaft journaled in said frame, a biased spiral spring connected to the shaft and to the frame to apply torque in one direction to the shaft, an operating knob adjacent one end of the shaft and rotatable relative thereto, means to apply a predetermined torque to said shaft when said knob is rotated, mechanism connecting the shaft to the elongated plates for relatively reciprocating the latter in opposite directions in response to opposite rotary movements of said shaft, and stop means to define the limit of movement of the elongated plates in at least one direction.

13. A gage as defined in claim 12 wherein the mechanism connecting the shaft to the plates comprises crank arm structure adapted to be rocked by rotary movement of said shaft and to reciprocate said elongated plates and said spring biases said shaft for rotation in a direction to move said plates to extended position, and wherein said torque applying means comprises a clutch between said knob and shaft having a torque transmitting capacity of a predetermined value in excess of the torque transmitting capacity of the spring.

ALBERT WIEBE.

References Cited in the file of this patent
UNITED STATES PATENTS

| Number | Name | Date |
|---|---|---|
| 141,915 | Bonnaz | Aug. 19, 1873 |
| 157,845 | Levering | Dec. 15, 1874 |
| 236,233 | Lamont | Jan. 4, 1881 |
| 834,973 | Fisk | Nov. 6, 1906 |
| 1,060,667 | Chenoweth | May 6, 1913 |
| 1,065,856 | Wickersheim | June 24, 1913 |
| 1,298,677 | Dollscheck | Apr. 1, 1919 |
| 1,309,654 | Parks | July 15, 1919 |
| 1,325,943 | Howard | Dec. 23, 1919 |
| 1,375,247 | Jonas | Mar. 15, 1921 |
| 1,547,668 | Poltin | July 28, 1925 |
| 1,554,226 | Martell | Sept. 22, 1925 |
| 1,605,923 | Darlington | Nov. 9, 1926 |
| 1,655,133 | Clase | Jan. 3, 1928 |
| 2,464,070 | Carcelli | Mar. 8, 1949 |